(No Model.)  2 Sheets—Sheet 1.

G. M. PETERS.
TOOL FOR HANDLING VEHICLE BODIES.

No. 343,195. Patented June 8, 1886.

Attest:
E. R. Hill
J. McStrehli

Inventor:
George M. Peters
per Wm. Hubbell Fisher,
Atty.

(No Model.) 2 Sheets—Sheet 2.

G. M. PETERS.
TOOL FOR HANDLING VEHICLE BODIES.

No. 343,195. Patented June 8, 1886.

Attest:
E. R. Hill
G. Wm. Strble

Inventor:
George M. Peters
per Wm. Hubbell Fisher,
Atty.

UNITED STATES PATENT OFFICE.

GEORGE M. PETERS, OF COLUMBUS, OHIO.

TOOL FOR HANDLING VEHICLE-BODIES.

SPECIFICATION forming part of Letters Patent No. 343,195, dated June 8, 1886.

Application filed February 12, 1883. Serial No. 84,781. (No model.)

*To all whom it may concern:*

Be it known that I, GEORGE M. PETERS, of the city of Columbus, in the county of Franklin and State of Ohio, have invented certain new and useful Improvements in Tools for Handling Vehicle-Bodies and Other Articles, of which the following is a specification.

The object of my invention is to provide a tool for handling and supporting various articles, which shall be desirable, cheap, light, and serviceable, and which admits of a ready attachment to and detachment from said articles without injury to the latter.

The several features of my invention and their more important uses and advantages will be apparant from the following description.

Figure 1:
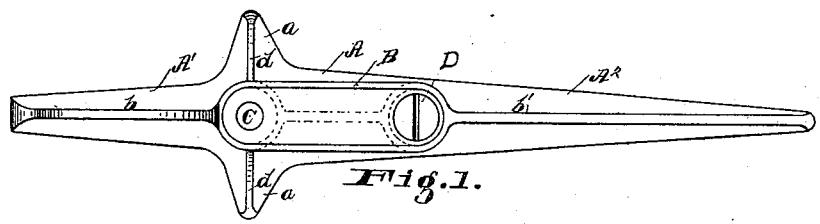
Figure 2:
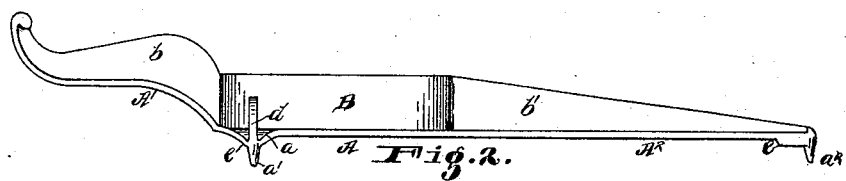
Figure 3:
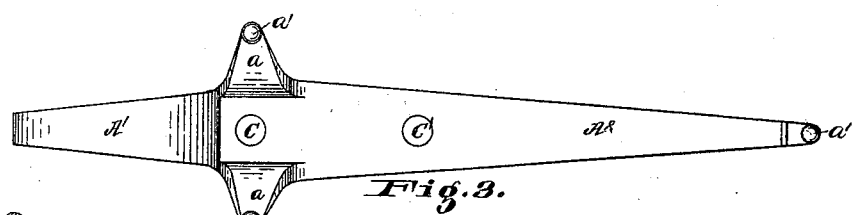
Figure 5:
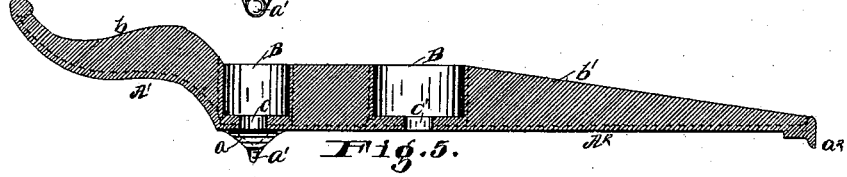
Figure 4:
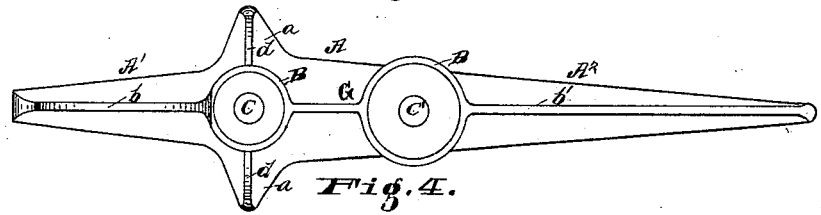
Figure 6:
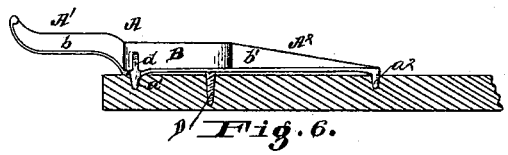
Figure 7:
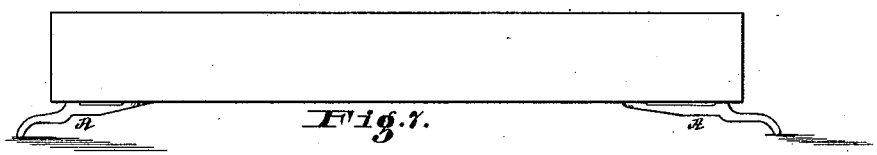
Figure 8:
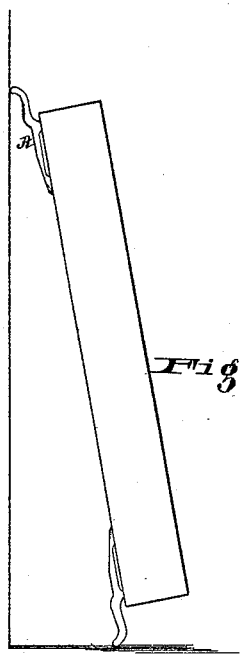
Figure 9:
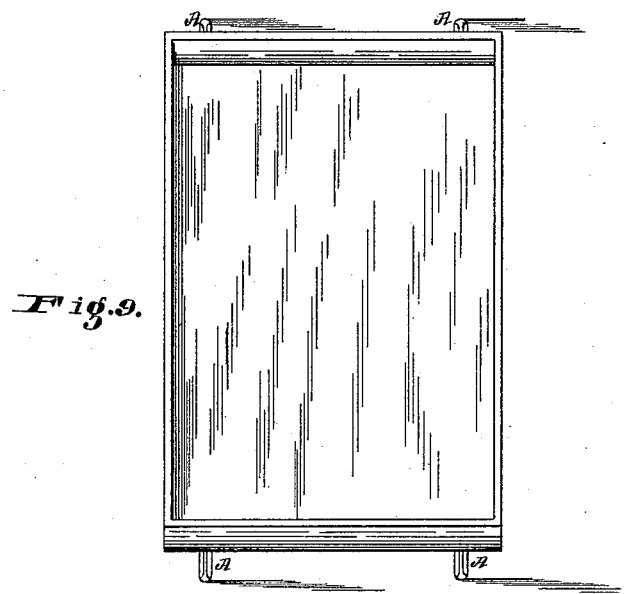

In the accompanying drawings, making part of this specification, Figure 1, Sheet 1, is a top view of the preferred form of my invention. Fig. 2, Sheet 1, is a side view of the device shown in Fig. 1. Fig. 3 is a bottom view of the same. Fig. 4, Sheet 1, represents a slightly modified form of the upper side of the device shown in the preceding figures. Fig. 5, Sheet 1, is a central longitudinal section of Fig. 4. Fig. 6, Sheet 2, represents the manner of attaching the device to the article to be handled. Figs. 7, 8, and 9 represent the tool as being attached to a vehicle-body, showing said body as being supported in different positions by said tools.

This tool has a body, A, a handle, A', and a tail or extension, A². The body A is provided with the side projections or feet, *a*, and the under side of each of these feet is provided with a spur or point, *a'*, and the end of the tail A² is also provided with a spur, *a²*, projecting from its lower face. The handle A' is curved up, as shown, so that its lower face is above the plane of the lower face of the body A and tail A², as shown in Fig. 2.

Extending from end to end of the handle A' and tail A², on their upper surfaces, are ribs *b b'*, and on the body A is a rib, B, preferably of an annular or oval form. Ribs *d* extend from the rib B out onto each of the feet *a*. These ribs impart strength to the tool, and yet allow it to be made very light and cheap.

Within the cavity formed by the annular rib B are the screw-holes C, preferably two in number, passing through the body A, through which screws are passed to secure the tool to the body.

Instead of forming the annular rib B as shown in Fig. 1—that is, extending it around both of the holes C—it may be formed as shown in Fig. 4, a separate annular rib being formed around each hole C. So, also, if desired for light work, only one instead of two holes C need be formed in the body, in which event the body-rib will be preferably formed as shown by dotted lines in Fig. 1.

In use these tools are applied in the following manner, viz: The tool is placed against or upon that portion of the article to be manipulated which is not exposed to view, and which may receive the spur-points without depreciating the value of the article. In the event of the article being a piano the tool would be applied to the bottom, and in the event of the article being a vehicle-body the tools would be applied to the under side of the bottom thereof, and, preferably, also to that upper part of the body on which the seat is to be placed, and which, when the seat is properly attached, will be concealed, the spurs being applied to the wood. A screw, D, is now inserted in the hole C and through the tool, and screwed into the body to which the tool is to be attached. As this screw is tightened, it draws the tool toward the surface of the article, and consequently causes the spurs to enter the wood of said article.

On light articles barbed nails may be used instead of screws, and in such cases the surface or surfaces G of the tool which has the holes for the reception of the nails may be formed nearer to or at the top face of the tool, so as to be more handy in driving the nails. If the surface G were thus raised, a recess, whenever desirable, might, for sake of lightness and cheapness, be formed on the under side.

Instead of the holes C or C', there may be present a series of holes or a slot for the reception of screws or nails.

When the article to be handled or supported is very heavy, an additional screw is necessary, and is to be inserted in the hole C' of that tool and screwed into the said article.

Fig. 6 of Sheet 2 of the drawings shows the manner in which the spurs and screws C enter the wood of the article to be handled, the wood being cut away down to two of the spurs and the screw D. The spurs combine with the screw or screws to hold the tool firmly in place.

Figs. 7, 8, and 9, Sheet 2, exhibit the application of the tool to that form of vehicle-body known as "piano-box."

In the matter of their use with vehicle-bodies these tools are usually employed during the period when the body is being painted and while it is left to dry.

Heretofore painters have been in the habit of attaching a temporary strip of wood to the bottom and top side of the body by screws or nails, and ordinarily placing blocks between the body and the strip, near the sides of the body; but this method is inconvenient and consumes considerable time, and is therefore not practical in factories manufacturing large numbers of bodies.

When a body is to be painted, a number of these tools—preferably four—are to be attached to the bottom, and two to the top side of the body or to the front edge of said frame, if the seat is painted while fastened to the body.

These tools are preferably so placed on the bottom of the vehicle-body that the end of the body A shall be back a short distance from the edge, as shown in the drawings, so that they will not interfere with the brush of the painter. By the handles A' the body may be conveniently lifted, and they also serve as feet to keep the body off from the floor while drying.

As soon as the paint on the body has become dry, the tools may be easily removed and applied to another body to be painted.

The tool is preferably provided with offsets $e$, located suitably. In the present instance these offsets are located at the base of the spurs $a'$ $a^2$. The purpose of these offsets is, where the tools are used in connection with bodies of vehicles that are being painted, to prevent the bottom of the tool from coming in contact with the article to which it is attached, or, in other words, to leave a space between the bottom of the tool and the article sufficient to allow the brush of the painter to be inserted between the tool and the article while painting the latter.

The foregoing illustration of the application of the feet to a vehicle-body shows the important uses and advantages when applied to articles other than vehicle-bodies. Thus in handling pianos or other articles while being painted, or irrespective of their being painted, such a device will be of great utility.

The handle may be padded when desired. When the tool is so applied as to not be liable to slip or turn, the spurs may be dispensed with, and in many cases only one or two spurs need be employed.

The construction of my tool is such that while it may be readily stamped or otherwise formed out of wrought-iron it may also be readily cast, and be strong and durable.

While the various features of my invention are preferably used together, one or more of them may be employed apart from the remainder, and also, when desired, one or more of the said features may be employed in connection, so far as applicable, with tools other than the one herein specifically described.

What I claim as new and of my invention, and desire to secure by Letters Patent, is—

1. The tool herein described, consisting of a body, A, provided with handle A', extension $A^2$, and feet $a$, the body being provided with one or more screw or nail holes or slots, C, and spurs, substantially as and for the purposes specified.

2. The herein-described tool, consisting of the body A, having annular rib B, said body being provided with handle A', and extension $A^2$, having longitudinal ribs $d$, said device being provided with spurs, substantially as and for the purposes specified.

3. In a tool for the purposes mentioned, the body A, provided with holes for screws or nails or slots, extension tail-piece $A^2$, feet $a$, and offsets and spurs, substantially as and for the purposes specified.

GEORGE M. PETERS.

Witnesses:
C. D. FIRESTONE,
W. SCOTT JONES.